United States Patent [19]

Kitamura et al.

[11] 3,862,096

[45] Jan. 21, 1975

[54] METHOD OF POLYMERIZING ACRYLIC MONOMERS

[75] Inventors: Shinichiro Kitamura, Kobe; Yasuo Toi, Suita; Toshizi Kano, Kobe, all of Japan

[73] Assignee: Kanegafuchi Kagaku Kogyo Kabushiki Kaisha, Osaka, Japan

[22] Filed: Dec. 4, 1972

[21] Appl. No.: 311,622

[30] Foreign Application Priority Data
Dec. 8, 1971 Japan.............................. 46-99623
Sept. 4, 1972 Japan.............................. 47-88922

[52] U.S. Cl.. 260/80.73, 260/29.6 H, 260/29.6 TA, 260/80.8, 260/80.81, 260/85.5 F, 250/85.5 D, 260/86.1 E, 260/88.7 D, 260/88.7 R, 260/89.7 R, 260/89.5 A, 260/89.5 R, 260/89.5 S, 260/885

[51] Int. Cl. .............................................. C08f 1/60

[58] Field of Search...... 260/89.5 A, 89.5 S, 89.5 R, 260/88.7 D, 88.7 R, 89.7 R, 885, 86.1 E, 80.73, 80.8, 80.81, 85.5 F, 85.5 D

[56] References Cited
UNITED STATES PATENTS

| | | | |
|---|---|---|---|
| 2,097,263 | 10/1937 | Strain.............................. | 260/89.5 A |
| 2,396,997 | 3/1946 | Fryling........................... | 260/89.5 A |
| 2,543,636 | 2/1951 | Loritsch.......................... | 260/89.5 A |
| 2,768,156 | 10/1956 | Bredereck et al.............. | 260/88.7 R |
| 3,166,539 | 1/1965 | Schuchardt..................... | 260/89.5 A |

*Primary Examiner*—Lucille M. Phynes
*Attorney, Agent, or Firm*—Moonray Kojima

[57] ABSTRACT

A method of polymerizing acrylic monomers in which polymerizing and hardening of the monomer is carried out in the presence of an organic hydroperoxide and chlorosulfite, or a mixture of the organic hydroperoxide, chlorsulfite and one or more of the following (a) organic peroxide, (b) water, (c) organic acid soluble in acrylic monomers, (d) inorganic filler, and (e) one or more of magnesium oxide, zinc oxide, and magnesium hydroxide.

10 Claims, No Drawings

METHOD OF POLYMERIZING ACRYLIC MONOMERS

BACKGROUND OF THE INVENTION

This invention relates to a method of polymerizing acrylic monomers.

In the prior art there are various methods for polymerization of acrylic monomer. These methods involve heating the monomer in the presence of a suitable catalyst, or irradiating the monomer with ionizing radiation or ultra violet radiation. The latter method requires a particular type of installation with consequent high cost of polymerization. Therefore, the former method is generally used for industrial purposes. However, this method has a disadvantage in that a heat source which may be of any type or a heating apparatus is required for heating the monomer. Hence, the process is relatively complex and cost of production is high. Another disadvantage is that the process requires a long reaction time to complete the polymerization.

SUMMARY OF THE INVENTION

The present invention provides a method of polymerizing acrylic monomer, without the above mentioned disadvantages, which completes the reaction within a relatively short reaction time without heating the monomer.

Extensive studies were made by the present inventors to eliminate the aforementioned and other deficiencies of the prior art. The studies resulted in a novel polymerization catalyst which led to the present invention. This catalyst is suitable for polymerizing pure acrylic monomer, and is particularly suitable for obtaining molding articles of complex of acrylic resins with inorganic substances or with water from a polymerization system with a large quantity of water or with inorganic fillers.

The present invention encompasses a method of polymerizing acrylic monomers. It comprises polymerizing and hardening monomers in the presence of component 1 and component 2, or a mixture of component 1, component 2 and one or more component which is selected from the group of component 3 to component 7, the components being:

component 1:
  organic hydroperoxide
component 2:
  compounds given by the formula ROSOCl (where R denotes organic group)
component 3:
  organic peroxide
component 4:
  water
component 5:
  organic acid soluble in acrylic monomers
component 6:
  inorganic filler
component 7:
  one or mixture of at least two components selected from the group of magnesium oxide, zinc oxide, and magnesium hydroxide.

DETAILED DESCRIPTION OF PREFERRED EMBODIMENTS

The acrylic monomers to be used in this invention may be acryl amide, acrylic acid, acrylonitrile, methacrylic acid, and their esters which contain multifunctional monomers such as dimethacrylates and trimethacrylates, used as cross-linking agents. A monomer or a mixture of two monomers may be used, but a polymer soluble in the monomer may be dissolved in the monomer at desired concentrations.

This invention has an advantage in that the addition of organic hydroperoxide and a compound designated by the general formula ROSOCl (referred as chlorsulfites) to acrylic monomer, the polymerization is initiated immediately and is completed within several minutes to 60 minutes without any heating. However, the mixture may be heated in order to complete the reaction within a shorter reaction time. If desired, the reaction rate can be further increased by the addition of organic peroxide, for example, benzoyl peroxide, stearoyl peroxide, lauroyl peroxide, or 3,5,5-trimethyl hexanoyl peroxide in an amount of from 0.3 to 1 percent by weight to the monomer.

Another way of speeding up the polymerization velocity involves adding beforehand a small amount of water to the monomers; that is, when water of an amount of 0.01 to 2.5 times as much as the amount of chlorsulfite is added to the monomers, polymerization velocity increase twice to four times as much as the polymerization velocity in the case of no water.

Usually, a small amount of water is contained in the monomer. Water in the monomer has been found to increase polymerization velocity. Therefore, when moderate polymerization velocity is desired, polymerization velocity may decrease by previous dehydration of the monomer. Desired polymerization velocity may be obtained by regulating an amount of water in the monomers.

The amount of organic hydroperoxides to be used in the invention is preferably from 0.1 to 3 percent by weight to the monomer. The amount of chlorosulfites to be used in the inventive process is preferably from 0.4 to 1.0 mole, or more favorably, 0.6 to 0.9 mole to one mole of the organic hydroperoxide. The chlorosulfites can be synthesized easily from thionyl chloride and an organic compound carrying hydroxyl group. Among chlorosulfites, methylchlorosulfite is obtained most favorably. However, any organic chlorosulfite can be used successfully in the invention and the chlorosulfite used for the invention is not limited to methyl chlorosulfite. Organic hydroperoxides which can be used in the invention are cumene hydroperoxide, t-butyl hydroperoxide, p-menthane hydroperoxide and di-isopropylbenzene hydroperoxide.

The present invention is further illustrated for the case of methylmethacrylate as an example. To methylmethacrylate a required amount of the inventive catalyst, which is a mixture of organic hydroperoxide and chlorosulfite, was added and the reaction system was stirred thoroughly. The reaction mixture was then poured into an appropriate mold and left in a closed container to prevent the evaporation of the monomer. Solid methacrylate resin was obtained after several minutes. When a mold is not used, the polymerization can be carried out for a monomer which is impregnated in paper, molded plaster or mortar, and the like.

The polymerization catalyst of the present invention is particularly suitable for manufacturing water containing acrylic resin. The water containing acrylic resin can be manufactured by a method which will be illustrated below for the case of methlmethacrylate as an example. It is to be understood that this particular monomer is used only for illustrative purposes. Other monomers are intended to be covered hereby. The polymerization of methylmethacrylate was initiated by the method mentioned above, and 0.1 to 5 times, or more favorably, 0.5 to 2 times of water was added to the monomer under agitation, when the temperature of the reaction mixture was increased to 40° to 80°C, or more favorably, 50° to 70°C by polymerization heat. Surprisingly, the mixture immediately turned to milky homogeneous emulsion which, after the addition of inorganic filler or without any treatment, was poured into an appropriate mold. Approximately less than one hour, although the time required for complete polymerization and curing was changed a little depending on the amount of catalyst and water added and temperature of water, the polymerization and hardening was completed and white methacrylate resin containing a large amount of water was obtained. The polymerization and hardening velocity become higher, the larger the quantity of catalyst used, the smaller the quantity of water, and higher the temperature of water. Therefore, the reaction condition can be selected so that an appropriate polymerization and hardening velocity may be obtained.

The emulsion can be used as an excellent and easily obtainable water-proof agent because the emulsion polymerizes even when impregnated in an inorganic material of poor water resistance, such as plaster board.

Another advantage of the present invention is that the catalyst is suitable for manufacturing artificial stone and the like by polymerizing and hardening a mixture of acrylic monomers containing a large amount of inorganic filler. The polymerization of acrylic monomer containing inorganic filler cannot be performed by any conventional method because of the deficiencies mentioned below.

One deficiency is that the mixture cannot be poured into a mold for polymerization and hardening due to poor fluidity. Another deficiency is that uniform molded articles cannot be obtained because inorganic fillers precipitate during the polymerization. According to the present invention, the viscosity of the system increases so fast due to the high rate of polymerization that inorganic fillers do not precipitate during the polymerization.

The first mentioned deficiency was resolved by the present inventors by prior addition of an organic acid soluble in acrylic monomer in an amount of from 0.2 to 10 percent by weight to the monomer. The organic acids may be acrylic acid, acetic acid, propionic acid and benzoic acid. These organic acids not only enhance the compatibility of monomers with an inorganic filler, but also increase markedly the polymerization velocity with further use of metallic salt such as magnesium oxide, zinc oxide and magnesium hydroxide.

These metallic salts may be used in a large amount as a sort of inorganic filler. However, more than several percent of the metallic salt based on the weight of monomer is sufficient to effect increase of the polymerization velocity. An insufficient amount of inorganic filler gives unuseful results, and an excess amount brings about high viscosity of the mixture to make processing difficult. Satisfactory results are usually obtained by use of an inorganic filler in an amount of between 25 to 400 percent, preferably, between 100 and 200 percent based on the weight of the monomer. Suitable inorganic fillers for this purpose are calcium sulfates, aluminum hydroxide, calcium carbonate, balloon of sirus (hollow spherules of volcanic ashes), powder of stone and silica powder. Also there may be added suitable amounts of reinforcing agent such as asbestos and glass fibers.

This invention will now be further illustrated, without intending to be limited thereto, by the following actual examples.

EXAMPLE 1

In 50 grams of dioxane was dissolved 50 grams of acrylamide and 0.7 grams of cumene hydroperoxide and 0.3 ml of n-propyl chlorosulfite were added. From the resulting solution a white precipitate was formed immediately. The white precipitate was the polymer which was not dissolved in methanol.

EXAMPLE 2

To 100 grams of acrylonitrile were added 1.4 grams of cumen hydroperoxide and then 0.7 grams of methylchlorosulfite. Polymerization reaction was initiated immediately and temperature of the mixture was raised to 82°C in 4 minutes and white polymer was produced.

EXAMPLE 3

100 grams of methyl methacrylate containing 10 weight percent of polymethyl methacrylate dissolved therein, 10 grams of tri-methylol propane trimethacrylate and 1.7 grams of t-butyl hydroperoxide were mixed well. To the mixture was added 1 ml of methylchlorosulfite and mixed well. Titanium paper was immersed in the resulting mixture for about 3 seconds, put between two pieces of glass plates, heated in an air oven at 80°C for 30 minutes and taken out from the oven to produce a paper covered with resin. Weight of the resin loaded was about the same as that of the original paper.

EXAMPLE 4

100 grams of methyl methacrylate containing 20 weight percent of polymethyl methacrylate dissolved therein, 10 grams of trimethylol propane trimethacrylate, 10 grams of methacrylic acid, 2.8 grams of cumene hydroperoxide and 0.4 grams of lauroyl peroxide were mixed well and cooled down to 0°C. To the mixture 1.2 ml of n-propyl chlorosulfite was added and mixed well. The resulting mixture was coated on a plate of plaster board. The board was then laminated with the resin-covered paper produced by the procedure of Example 3 to give a strong composite of resin covered paper and plaster board.

Thus, the composite member was produced by one part of the mixture coated on the plaster board being polymerized in the impregnated plaster board and the other part being polymerized in a dissolved state in resin covered on the paper.

EXAMPLE 5

300 grams of methyl methacrylate, 20 grams of trimethyl propane trimethacrylate, 3 grams of lauroyl peroxide and 2.8 grams of cumene hydroperoxide were mixed well. There was further added, 1.0 ml of methyl chlorosulfite. When the temperature of the mixture was raised to 67°C in 5 minutes, 300 grams of water being at 30°C was added under stirring.

The emulsion thus obtained was poured into a mold. After one hour, brilliant white methacrylate resin containing water was produced from the mold.

EXAMPLE 6

A plaster board was immersed in the emulsion prepared by the procedure of example 5 for 5 minutes and dried in open air at room temperature for 5 hours. The plaster board thus treated contained about 2 percent of water based on the weight of the original board. Test on the treated plaster board was made by immersing in running water for 3 days. No quantity of plaster was dissolved out in water at all.

EXAMPLES 7 to 16

The mixtures containing acrylic monomer as a principal component and inorganic filler were polymerized in the conditions as shown in Table 1.

In each case, prior to adding inorganic filler, organic acid was added to monomer mixtures.

Chlorosulfite was added to the mixture in the last step.

The monomer mixture consisted of 100 grams of acrylic monomer containing 3 percent of triethylene glycol dimethacrylate based on the weight of the monomer, 1 gram of organic peroxide, 10 grams of metallic salt, 10 mmol of hydroperoxide and 7 mmol of chlorosulfite. 156 grams of inorganic filler was used. In example 15, 100 grams of calcium carbonate and 56 grams of hollow spheruls of volcanic ashes were added to the mixture.

Curing times and highest temperatures attained due to generation of reaction heat are shown in Table 2.

Table 2

| Example No. | Hardening Time min. | Highest Temperature °C |
|---|---|---|
| 7 | 20 | 149 |
| 8 | 12 | 155 |
| 9 | 17 | 148 |
| 10 | 13 | 154 |
| 11 | 26 | 139 |
| 12 | 19 | 145 |
| 13 | 23 | 143 |
| 14 | 24 | 135 |
| 15 | 15 | 145 |
| 16 | 3 | 142 |

EXAMPLE 17

200 grams of methyl methacrylate, 15 grams of trimethylolpropane trimethacrylate, 2 grams of lauroyl peroxide, and 2.8 grams of cumene hydroperoxide were mixed well and then there was added 1.2 ml of n-propyl chlorosulfite. The temperature of the mixture was raised to 69°C in about 7 minutes and then 200 grams of water being at 60°C was added under stirring. Further, 30 grams of hollow spherules of volcanic ashes and 70 grams of calcium sulfate dihydrate were added. After stirring vigorously the entire mixture was poured into a mold, closed tightly and left standing at room temperature.

After 1 hour methacrylate resin having water and inorganic filler was produced from the mold.

EXAMPLES 18 to 23

Methyl methacrylate (100 grams) was mixed with methacrylic acid (1.5 grams), lauroyl peroxide (1

Table 1

| Example No. | Monomer | Hydroperoxide | Chlorosulfite | Organic peroxide | Organic acid | Inorganic filler | Metallic salt |
|---|---|---|---|---|---|---|---|
| 7 | Methyl methacrylate | Cumene hydroperoxide | Methyl chlorosulfite | Lauroyl peroxide | Methacrylic acid | Calcium carbonate | Magnesium oxide |
| 8 | do. | do. | n-propyl chlorosulfite | do. | do. | do. | do. |
| 9 | do. | do. | iso-propyl chlorosulfite | do. | do. | do. | do. |
| 10 | do. | do. | Phenyl chloro sulfite | do. | do. | do. | do. |
| 11 | do. | t-Butyl hydroperoxide | Methyl chlorosulfite | Benzoyl peroxide | do. | Aluminum hydroxide | Zinc oxide |

| Example No. | Monomer | Hydroperoxide | Chlorosulfite | Organic peroxide | Organic acid | Inorganic filler | Metallic salt |
|---|---|---|---|---|---|---|---|
| 12 | Methyl methacrylate | Cumene hydroperoxide | Methyl chlorosulfite | Lauroyl peroxide | Methacrylic acid | Aluminum hydroxide | Magnesium hydroxide |
| 13 | do. | do. | do. | do. | Acrylic acid | Calcium carbonate | Magnesium oxide |
| 14 | do. | do. | do. | do. | Benzoic acid | do. | do. |
| 15 | do. | do. | do. | do. | Methacrylic acid | Balloon of volcanic ashes + Calcium carbonate | do. |
| 16 | t-Butyl acrylate | do. | do. | do. | do. | Calcium carbonate | do. | gram) and cumene hydroperoxide (1.4 grams). Zinc oxide or magnesium oxide in variety of amounts was added, then methyl chlorosulfite (0.5 ml) was added thereto. The resultant mixture was put in an aluminum vessel (200 ml), closed tightly, and allowed to stand at room temperature.

Table 3 shows the resulting polymerization and hardening times and maximum exothermal temperatures for the different metal salts and amounts.

Table 3

| No. | Metal salt | Amount of the metal salt (g) | Polymerization & hardening time (min.) | Maximum exothermal temperature (°C) |
|---|---|---|---|---|
| 18 | Zinc oxide | 5 | 23 | 153 |
| 19 | do. | 2 | 26 | 151 |
| 20 | do. | 1 | 28 | 150 |
| 21 | do. | 0.5 | 33 | 145 |
| 22 | Light magnesium oxide | 20 | 7 | 160 |
| 23 | do. | 5 | 14 | 158 |

EXAMPLES 24 to 31

In a glass beaker, methyl methacrylate (100 grams), methacrylic acid (1.5 grams), lauroyl peroxide (1 gram) and cumene hydroperoxide (1.4 grams) were mixed. Heavy calcium carbonate (150 grams), a metal compound (10 grams) used in the present invention (and varied for different examples), and methyl chlorosulfite (0.5 ml) were added thereto. The resultant mixture was allowed to stand at room temperature in an open atmosphere. Table 4 shows the resulting hardening times and maximum exothermal temperatures for the different metal compounds.

Table 4

| No. | Metal compound | Hardening time (min.) | Maximum exothermal temperature (°C) |
|---|---|---|---|
| 24 | Magnesium hydroxide | 19 | 140 |
| 25 | Basic magnesium carbonate | 52 | 139 |
| 26 | Zinc carbonate | 30 | 146 |
| 27 | Zinc sulfate | 70 | 124 |
| 28 | Zinc acetate | 48 | 132 |
| 29 | Stannous oxide | 56 | 134 |
| 30 | Lead oxide | 47 | 141 |
| 31 | Lead carbonate | 47 | 140 |

EXAMPLES 32 to 35

Magnesium oxide was used as the metal salt, and the kind of organic acid used in examples 24 to 31 was varied. The treatment was effected quite similarly to examples 24 to 31, except for the above-mentioned condition. Table 5 shows the results.

Table 5

| No. | Organic Acid | Hardening Time (min) | Maximum Exothermal Temperature (°C) |
|---|---|---|---|
| 32 | Acrylic Acid | 17 | 157 |
| 33 | Benzoic Acid | 20 | 137 |
| 34 | Propionic Acid | 21 | 128 |
| 35 | Oleic Acid | 50 | 153 |

EXAMPLE 36

Precipitated calcium carbonate (122 grams) was mixed with a syrup (100 grams) of methyl methacrylate containing 10% polymethyl acrylate. Methacrylic acid (1.5 grams), cumene hydroperoxide (1.4 grams), lauroyl peroxide (1 gram) and magnesium oxide (5 grams) were added thereto. Methyl chlorosulfite (0.5 ml) was added to the resultant mixture. The mixture formed a layer of 1.8 cm thickness and was allowed to stand at room temperature. The maximum exothermal temperature arrived at 129°C in 15 minutes, and complete curing was attained.

The polymerization was effected according to the polymerizing method described in Japanese Pat. Publication No. 4629/1970, Example 18, but the curing time of 2 to 5 hours was shortened to a great extent by this method.

Control Examples 1 to 5

The polymerization was effected as in Example 24, except that for each case one of the 5 components was excluded. Table 6 shows the results of the hardening time and maximum exothermal temperature.

Table 6

| No. | Component excluded from Example 24 | Hardening time (min.) | Maximum exothermal temperature (°C) |
|---|---|---|---|
| 1 | Magnesium hydroxide | over 300 | 45 |
| 2 | Lauroyl peroxide | over 300 | 46 |
| 3 | Methacrylic acid | over 300 | 43 |
| 4 | Methyl chlorosulfite | Not cured | Not exothermic |
| 5 | Cumene hydroperoxide | do. | do. |

The foregoing description of the invention is for illustrative purposes. Numerous variations and modifications thereof would be apparent to one skilled in the art. All such variations and modifications are to be considered to be within the spirit and scope of this invention.

What is claimed is:

1. A method of polymerizing one or more acrylic monomers selected from the group consisting of acrylic acid, methacrylic acid, and their esters and acrylamide, and acrylonitrile, by polymerizing and hardening said one or more acrylic monomers in the presence of an organic hydroperoxide selected from the group consisting of alkyl hydroperoxide, aryl hydroperoxide and aralkyl hydroperoxide, which has one or two of -O-O-H group, and mixtures thereof, and a compound having the general formula ROSOCl, wherein R is alkyl, aryl or aralkyl.

2. The method of claim 1, wherein said polymerizing and hardening is done also in the presence of one or more of the following (a) organic peroxide selected from the group consisting of diacylperoxide, dialkylperoxide, peracid ester and ketonperoxide, (b) saturated or unsaturated organic acid having one or more carboxyl group which is soluble in said acrylic monomers, (c) one or more of magnesium oxide, zinc oxide, and magnesium hydroxide.

3. The method of claim 1, wherein said organic hydroperoxide is used in an amount ranging from 0.1 to 3 percent by weight of said monomer, and said compound is used in an amount ranging from 0.4 to 1.0 mole to one mole of said organic hydroperoxide.

4. The method of claim 3, wherein said amount of said compound ranges from 0.6 to 0.9 mole to one mole of said organic hydroperoxide.

5. The method of claim 1, wherein said compound is methylchlorosulfite.

6. The method of claim 1, wherein said organic hydroperoxide is selected from the group consisting of cumene hydroperoxide, t-butyl hydroperoxide, p-menthane hydroperoxide and di-isopropylbenzene hydroperoxide.

7. The method of claim 2, wherein an organic acid soluble in acrylic monomer is added in an amount ranging from 0.2 to 10 percent by weight to said monomer.

8. The method of claim 7, wherein said acid is selected from the group consisting of acrylic acid, acetic acid, propionic acid and benzoic acid.

9. The method of claim 1, wherein heat is applied.

10. The method of claim 2, wherein said organic peroxide is selected from the group consisting of benzoyl peroxide, stearoyl peroxide, lauroyl peroxide and 3,5,5-trimethyl hexanoyl peroxide, and said organic peroxide is used in an amount ranging from 0.3 to 1 percent by weight of said monomers.

* * * * *